(12) United States Patent
Conrad (10) Patent No.: US 6,361,686 B1
(45) Date of Patent: Mar. 26, 2002

(54) CONSTRUCTION OF A WATER TREATMENT RESERVOIR FOR A DOMESTIC WATER TREATMENT APPLIANCE

(75) Inventor: Wayne Ernest Conrad, Hampton (CA)

(73) Assignee: Fantom Technologies Inc., Welland (CA)

( * ) Notice: Subject to any disclaimer, the term of this patent is extended or adjusted under 35 U.S.C. 154(b) by 0 days.

(21) Appl. No.: 09/417,836

(22) Filed: Oct. 14, 1999

(51) Int. Cl.[7] .................................................. C02F 1/30
(52) U.S. Cl. ........................ 210/192; 210/120; 210/188; 210/472; 210/473; 210/474; 222/185.1; 222/189.06; 422/186.07
(58) Field of Search .................................. 210/120, 143, 210/192, 232, 234, 235, 436, 472, 473, 188, 85, 282, 474; 422/186.07; 222/173, 185.1, 189.06

(56) References Cited

U.S. PATENT DOCUMENTS

| | | | |
|---|---|---|---|
| 3,692,180 A | * | 9/1972 | Laraus ........................ 210/192 |
| 4,599,170 A | | 7/1986 | Friedman et al. ........... 210/223 |
| 4,652,370 A | | 3/1987 | Bachhofer et al. .......... 210/192 |
| 4,654,142 A | | 3/1987 | Thomsen et al. ........... 210/232 |
| 5,106,495 A | | 4/1992 | Hughes ....................... 210/139 |
| 5,308,482 A | | 5/1994 | Mead .......................... 210/207 |
| 5,607,582 A | * | 3/1997 | Yamazaki et al. .......... 210/235 |
| 6,013,189 A | * | 1/2000 | Burris ......................... 210/192 |
| 6,103,114 A | * | 8/2000 | Tanner et al. ............... 210/472 |
| 6,159,363 A | * | 12/2000 | Collins et al. .............. 210/472 |
| 6,254,768 B1 | * | 7/2001 | Dilieu et al. ................ 210/473 |

FOREIGN PATENT DOCUMENTS

| | | |
|---|---|---|
| CA | 1223231 | 6/1987 |
| CA | 1252071 | 4/1989 |
| CA | 2093006 | 4/1993 |
| CA | 2113388 | 7/1994 |
| CA | 2089414 | 8/1994 |
| CA | 2180185 | 12/1996 |
| CA | 2171515 | 9/1997 |
| CA | 2206149 | 11/1998 |

* cited by examiner

Primary Examiner—Joseph W. Drodge
(74) Attorney, Agent, or Firm—Philip Mendes da Costa Bereskin & Parr

(57) ABSTRACT

A treatment carafe for an apparatus for treating ozone with water is disclosed. A treatment carafe has a water inlet which is automatically sealed when the user places the carafe on a base member. There is also provided a gas conduit so that off gases which accumulate in the carafe may be vented during the treatment cycle. The gas conduit is automatically connected in air flow communication with an off gas conduit when the carafe is placed on the base member.

35 Claims, 5 Drawing Sheets

CONSTRUCTION OF A WATER TREATMENT RESERVOIR FOR A DOMESTIC WATER TREATMENT APPLIANCE

FIELD OF THE INVENTION

This invention relates to water treatment apparatus, which uses a gas, preferably ozone, as a water treatment agent. In a preferred embodiment, the invention relates to a water treatment carafe for a domestic countertop water treatment appliance.

BACKGROUND OF THE INVENTION

Water treatment apparatus using oxidizing gases have been developed. Some of these devices operate on a batch basis. According to this process, the water is placed in a treatment container and the treatment agent (e.g. a gas), is disbursed through the water, such as via a sparger. Following the completion of the cycle, the water may then be used.

Ozone is an effective oxidizing agent. However, if the device releases excessive quantities of ozone, headaches and the like can occur. However, the treatment vessel is preferably airtight so that the ozone which is not consumed in the treatment cycle is collected and preferably converted to a benign gas (e.g. oxygen).

SUMMARY OF THE INVENTION

In accordance to the instant invention, a novel construction for a water treatment container is provided. The appliance comprises a base unit and a treatment vessel or reservoir (also known as a dirty water carafe). The carafe is removably mounted on the base. Accordingly, the carafe may be removed from the appliance so as to be filled with the water to be treated, eg. water from a kitchen tap. Accordingly, the carafe is of a limited volume which makes it easily manoeuvrable by a user (e.g. 1–5 litres, preferably about 2 litres). Once the carafe has been filled, it is returned to the base where the cycle may be commenced.

In one embodiment, the carafe has water inlets provided on the top thereof. For example, the top may be provided with a recess (which may act like a funnel). The recess may be provided with at least one opening, but preferably with a plurality of openings, which act as the water inlet. To fill the unit, the recess is placed under the tap and the water turned on. The water will enter into the recess and flow through the water inlet into the reservoir. Preferably, the carafe is filled to a pre-designated "fill line". According to this embodiment, the carafe is provided with a sealing member which is movably mounted between a first position in which the water inlet is sealed and a second position in which the water inlet is opened. A linkage is drivingly connected to the sealing member so as to move the sealing member between the second (open) and the first (closed) positions in response to the placement of the reservoir on the base. In this way, the carafe is sealed automatically when the carafe is placed on the base.

One advantage of the instant invention is that the carafe is automatically sealed when the unit is placed on the base. Therefore, the user does not have to consciously seal the container prior to the treatment process. Accordingly, there will be no accidental ozone leak if the user forgets to seal the water inlet ports or if the user does not properly attach a lid to the carafe.

In one embodiment, the linkage has an end portion which contacts the base when the reservoir is placed on the base whereby the contact between the end portion and the base moves the sealing member from the second position to the first position.

In another embodiment, the apparatus further comprises a biasing member to bias the sealing member to the second position.

In another embodiment, the reservoir has a recess provided in the upper surface and the water inlet is provided in the recess. The water may be treated with an oxidizing gas and an off gas receiving means associated with the reservoir may be provided for accumulation of the off gas. For example, the recess may be configured to define a head gas space in the reservoir in which off gas may accumulate after passing through water in the reservoir. A conduit in communication with the head gas space may further be provided whereby off gas may be conveyed from the head gas space during the treatment of water in the reservoir. A destructor for converting the off gas to a gas comprising oxygen and/or an off gas sensor may be provided in air flow communication with the conduit.

In another embodiment, the linkage comprises a support rod extending upwardly from the end portion to the sealing member.

In another embodiment, the reservoir has an inner surface and an opening, the end portion extending through the opening, and the apparatus further comprises a resilient member having an opening in sealing engagement with the support rod and a lower perimeter in sealing engagement with the interior surface of the reservoir surrounding the opening.

In another embodiment, the water is treated with an oxidizing gas and the reservoir has a head gas space in which off gas may accumulate after passing through water in the reservoir and the support rod comprises a conduit in communication with the head gas space whereby off gas may be conveyed from the head gas space during the treatment of water in the reservoir.

In accordance with another embodiment of the instant invention, the carafe is provided with a head gas space at an upper portion thereof. This may be provided at an interior portion of the carafe which surrounds the recess. A gas conduit is provided with the carafe. The conduit has a first end which is positioned in fluid flow communication with the head gas space. The conduit extends to an exterior surface of the carafe (preferably the bottom of the carafe) so as to be connected with a second conduit in the base. During operation of the unit, the conduit in the base is in fluid flow communication with an off gas treatment member. The off gas treatment member may be a destructor and/or a sensor. The destructor converts the oxidizing gas (e.g. ozone) to a benign gas (e.g. oxygen). Preferably, the second conduit in the base is in fluid flow communication with an off gas sensor. The off gas sensor monitors the oxidizing gas in the off gas and may use this information to control the cycle of the appliance. In another preferred embodiment, it is to be appreciated that the second conduit may be in contact with both an off gas sensor as well as a destructor.

In one embodiment, the apparatus further comprises a driving member for moving the sealing member between the first and second positions.

In another embodiment, the reservoir has a recess provided in the upper surface and the head gas space and the water inlet are provided in the recess.

In another embodiment, the driving member has an end portion which contacts the base when the reservoir is placed on the base whereby the contact between the end portion and the base moves the sealing member from the second position to the first position.

In another embodiment, the apparatus further comprises a biasing member to bias the sealing member to the second position.

In another embodiment, the conduit comprises part of the driving member.

In another embodiment, the driving member has a hollow interior which comprises the conduit.

An advantage of this embodiment is that when the carafe is placed on a base, and the unit is operated, the head gas space in the carafe is automatically placed in fluid flow communication with an off gas sensor and/or destructor. There is no need for the user to make any connections between the head gas space and the rest of the appliance thus ensuring that there is no accidental release of ozone to the environment by the user forgetting to complete a connection.

BRIEF DESCRIPTION OF THE DRAWINGS

These and other advantages of the instant application will be more fully and clearly understood in connection with the following description of a preferred embodiment of the invention in which.

DESCRIPTION OF THE PREFERRED EMBODIMENT

Figure 1:
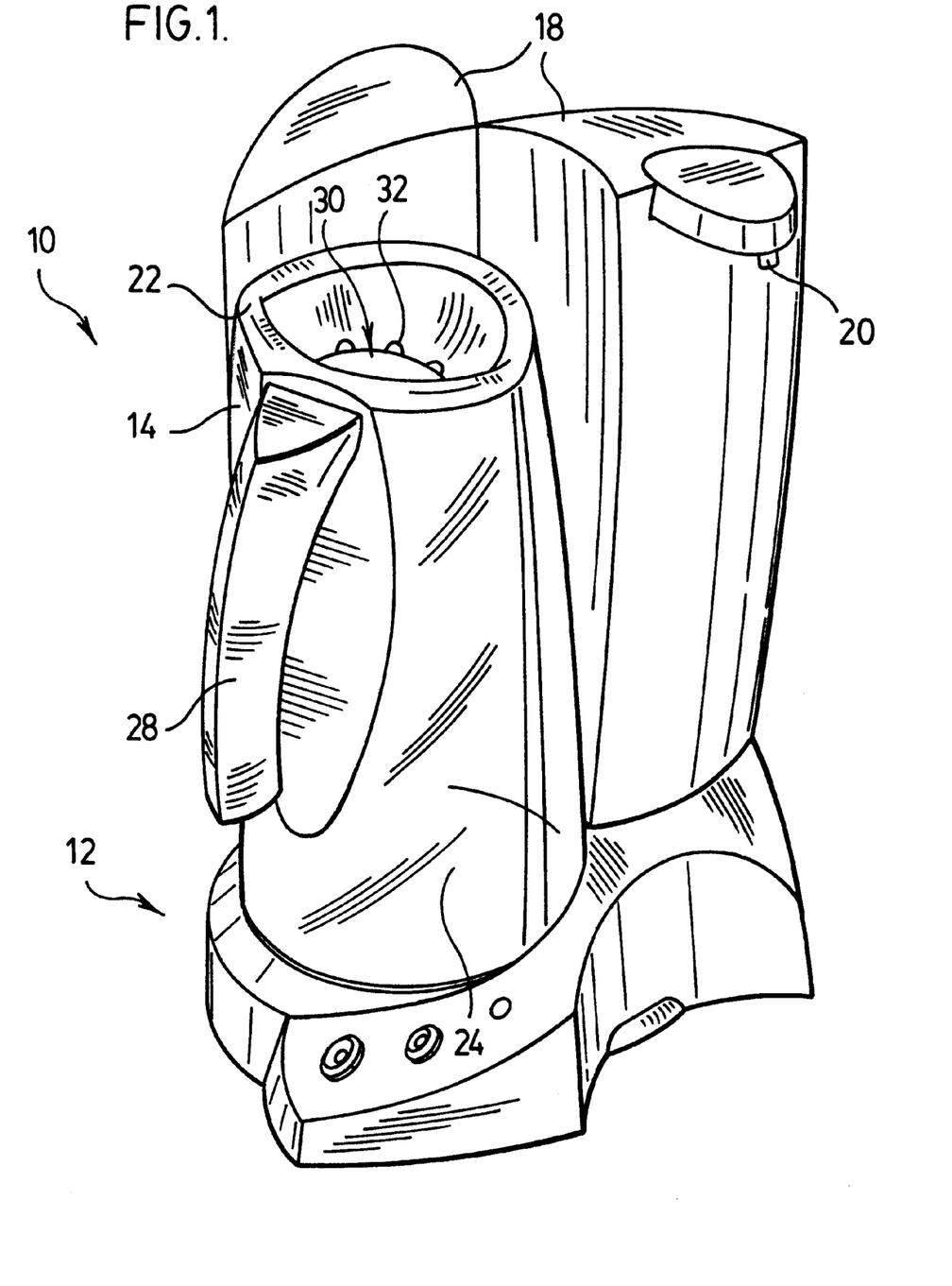
FIG. 1 is a perspective view of an apparatus according to the instant invention.
Figure 2:
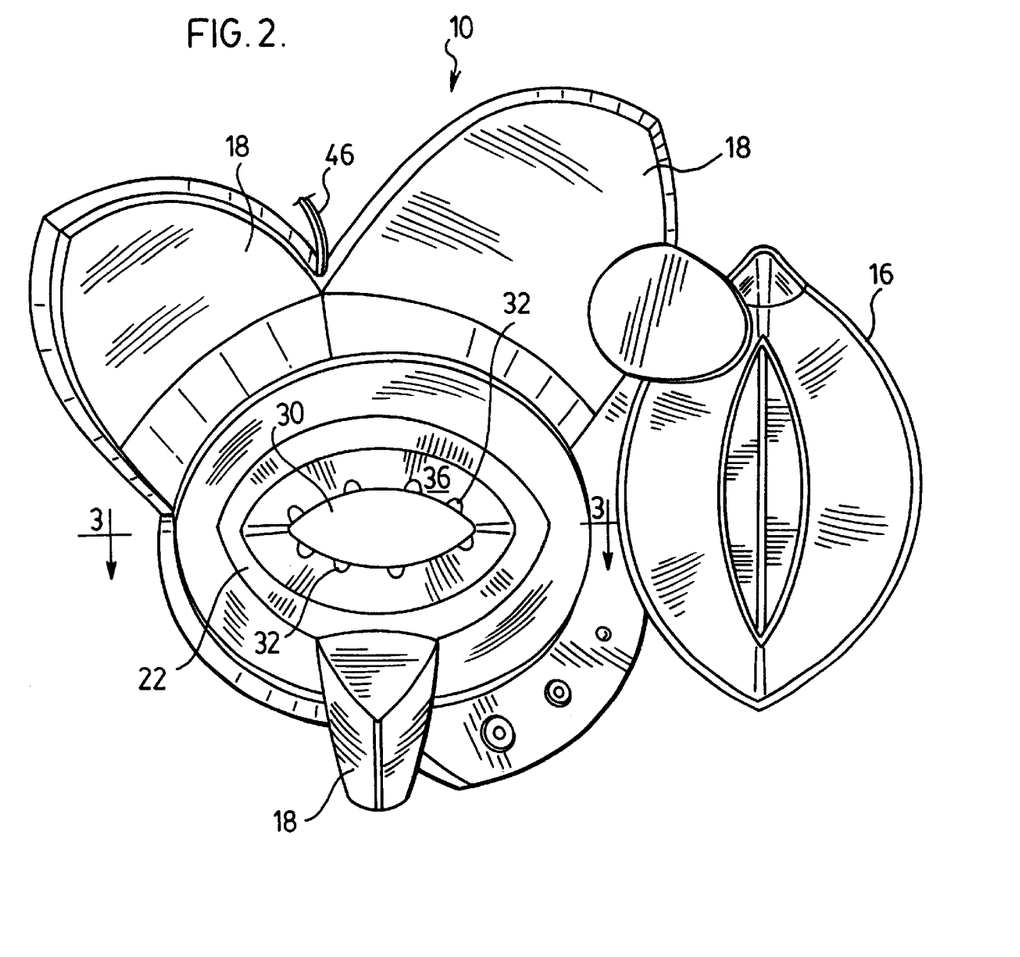
FIG. 2 is a top plan view of FIG. 1 with a treated water carafe shown in position for receiving water dispensed from the apparatus of FIG. 1.

Referring to FIGS. 1 and 2, the water treatment apparatus is generally designated by reference numeral 10. The apparatus comprises a base 12, removable treatment carafe 14 and housing 18. Housing 18 may be of any particular design and may contain any required sensing equipment, water filters, pumps and the like. Housing 18 is preferably connectable in flow communication with treatment carafe 14 such that treated water may be dispensed from dispenser 20 after the completion of the treatment cycle of the water in treatment carafe 14. As shown in FIG. 2, a treated water carafe 16 may be positioned underneath dispenser 20 for receiving the treated water.

The shape and configuration of treatment carafe 14 and treated water carafe 16 may be of any particular design which is aesthetically pleasing. As shown in particular in FIGS. 3 and 5, treatment carafe 14 has a top 22, side walls 24 and a bottom 26. Optionally, as shown in FIGS. 1 and 2, a handle 28 may be provided to allow the user to manipulate carafe 14.

Carafe 14 is designed to be filled with a liquid which is to be treated. In particular, it is preferred that the liquid is water. Carafe 14 is removably mounted to base 12. Accordingly, when the user wishes to treat water, the user may be move carafe 14, e.g. by means of handle 28. The top 22 of carafe 14 may be placed underneath a source of water (e.g. a kitchen tap) and the tap may be turned on to allow the carafe to be filled. Once filled, carafe 14 may then be placed on base 12.

Figure 5:
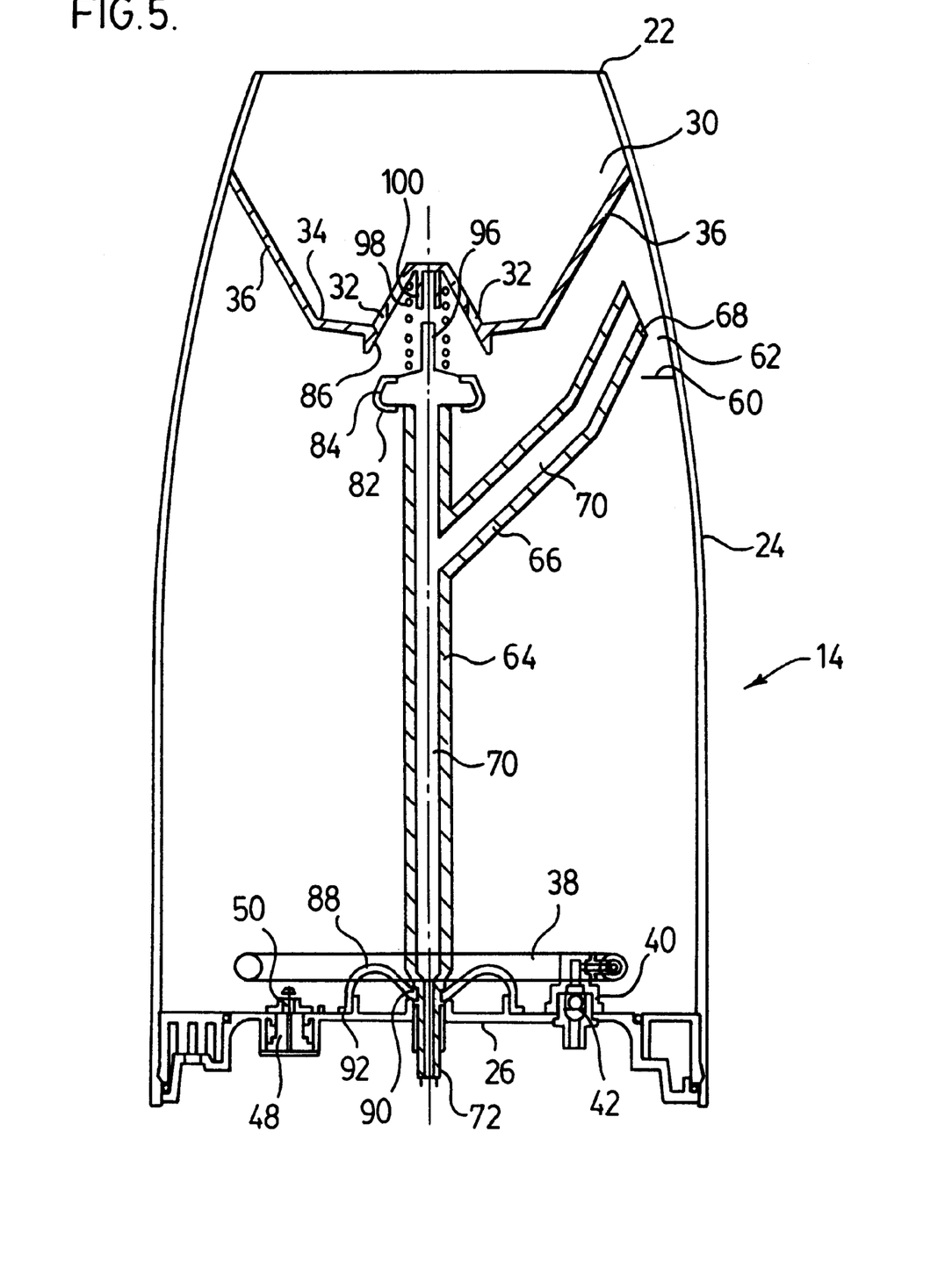

In one preferred embodiment of this invention, in order to simplify the filling operation, top 22 is provided with a recess 30. The upper portion of carafe 14 is provided with at least one, but preferably a plurality of water inlet ports 32 in recess 30. Recess 30 may be of any particular configuration which provides an open area in which the water to be treated may be poured so that it may drain into carafe 14 through water inlet ports 32. Accordingly, as shown in FIG. 5, recess 30 may be funnel shaped. For example, the upper portion of cavity 14 has an upper surface 34. A portion of upper surface 34 may comprise sloped portion 36 which extends downwardly towards the centre of carafe 30. By designing carafe 14 with a recess 30 containing water inlet ports 32, the user need not remove a lid from carafe 14 so as to fill it. It will be appreciated that the automatic sealing mechanism and the automatic gas conduit connection feature of this invention may be designed to work regardless of the shape of the top of carafe 14. For example, the top of carafe 14 may be flat and that inlet ports 32 may be provided in the flat top (not shown). The creation of a recess provides a funnel to reduce or prevent spillage during the filling operation.

The water in treatment carafe 14 is treated with an oxidizing gas. The oxidizing gas is preferably ozone. However, other oxidizing gases such as hydrogen peroxide are known. The remaining description is based upon a preferred embodiment in which the oxidizing gas is ozone.

When the treatment cycle is commenced, ozone is introduced into carafe 14. In the preferred embodiment, carafe 14 is provided with an annular sparger 38 which has a plurality of openings in the surface thereof. Sparger 38 is connected to a supply port 40. Supply port 40 has an associated valve 42. Base 12 is provided with a supply conduit 44 which is seated immediately below valve 42. Supply conduit 44 is in air flow communication with a source of ozone. For example, an air pump may be positioned upstream of supply conduit 44 so as to feed air to an ozone generator which in turn provides a feed supply of ozone to supply conduit 44. The air pump and the ozone generator may be provided in one of the housings 18. Electricity to run the electronics of the unit, including the air pump and the ozone generator, may be supplied by means of electric cord 46 (see FIG. 2).

Valve 42 is movable between an open position and a closed position. When valve 42 is in the closed position, sparger 38 is sealed. Accordingly, as water is introduced into carafe 14, water will not drain through supply port 40. When valve 42 is in the open position, ozone may be supplied via conduit 44, through port 40 into sparger 38. Valve 42 may be moved from the closed position to the open position by means of the force of ozone containing air passing through conduit 44. It is to be appreciated that valve 42 may be biased to the closed position by gravity, a spring or the like.

Treated water may be decanted from carafe 14 by any means known in the art. Accordingly, carafe 14 could be removed from base 12 and the water decanted such as by means of a spout or the like. Preferably, the treated water is decanted from carafe 14 while carafe 14 is positioned on base 12. To this end, a water exit port 48 may be provided in bottom 26 (see FIG. 3). A valve 50 is provided in water exit port 48. At the end of a cycle, valve 50 may be actuated, for example, by the means of solenoid 52. When solenoid 52 is actuated, linkage 54 moves engagement member 56 upwardly. This movement displaces engagement member 56 upwardly so as to move displacer rod 58 upwardly. The upward movement of displacer rod 58 moves valve 50 to the open position allowing the treated water to exit through water exit port 48. Water exit port 48 may be in flow communication with a water pump so as to pump the treated water through a filter (e.g. a carbon block filter) which may be located in housing 18 and from there through dispenser 20 to, e.g. a glass or treated water carafe 16.

Figure 3:
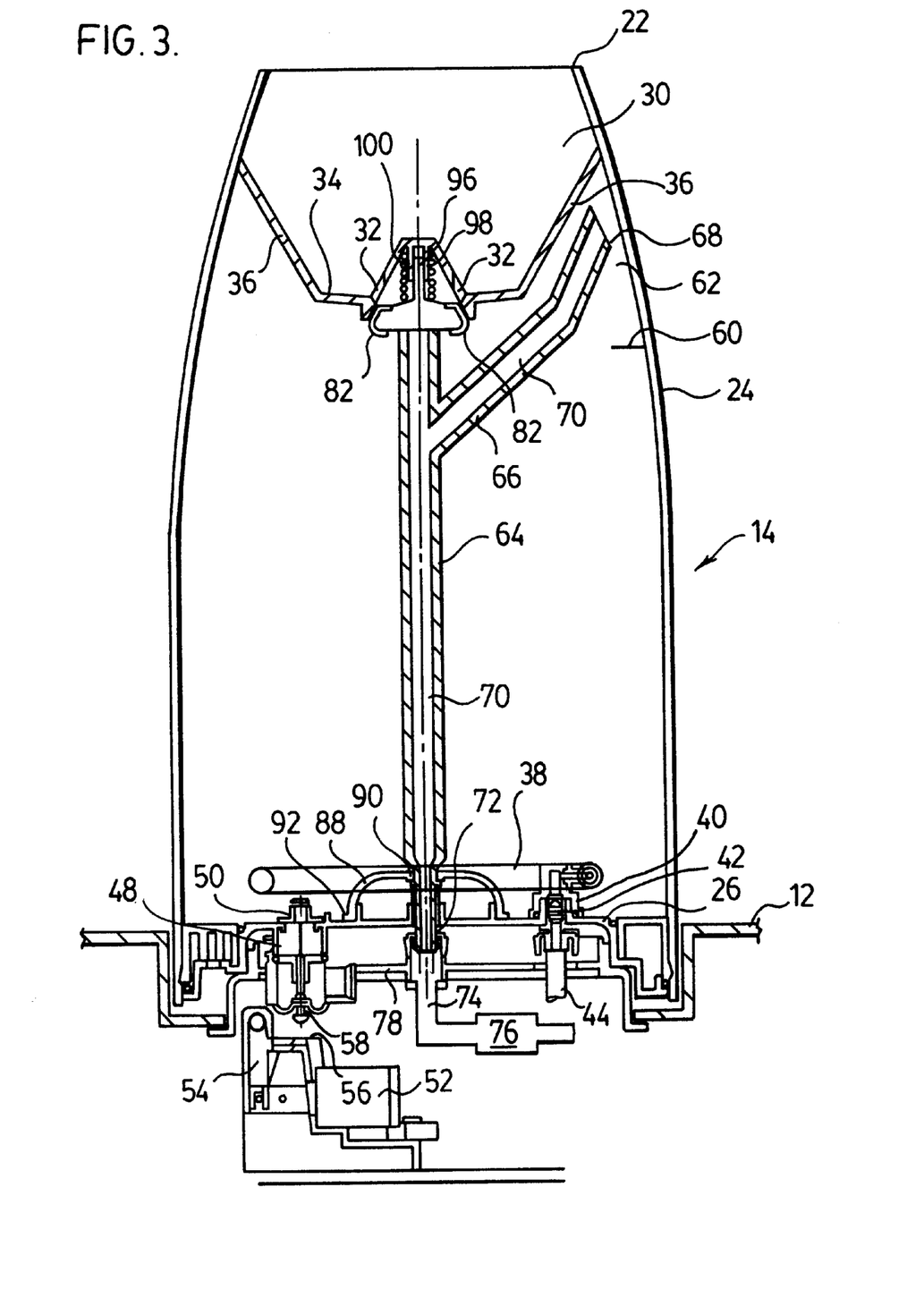
FIG. 3 is a cross-section along the line 3—3 in FIG. 2.

Carafe 14 may be provided with a fill line 60 so as to indicate to the user the portion of carafe 14 which should be filled with water to be treated. Fill line 60 may be provided at any location in carafe 14 provided a chamber or the like which acts as an off gas receiving means is provided above fill line 60 for receiving off gases. The top of carafe 14 may be flat if the carafe is not filled to the top. Alternately, the top of carafe 14 may be angled so as to direct the off gas to a particular location, head gas space 62. In the embodiment of FIGS. 3 and 5, the top of carafe 14 has an angled top to create an annular head gas space 62 in which the off gas may accumulate. During the treatment of water in carafe 14, ozone is bubbled through the water by means of sparger 38. The off gases accumulate above the water (e.g. above fill line 60) in head gas space 62.

Ozone may cause side effects in people exposed to sufficient quantities of these gases (e.g. headaches). Accordingly, the off gases are preferably collected and treated (e.g. by exposing them to a destructor which will convert the gas to a more benign form). For example, in the case of ozone, the destructor may be a catalyst for converting ozone to oxygen such as one or more of manganese dioxide, titanium dioxide, iron oxide and carbon. Contact between ozone and one or more of these catalysts will case the ozone to convert to oxygen which may then be released harmlessly from the system. Accordingly, in one preferred embodiment, carafe 14 includes a gas conduit having a first end in fluid flow communication with head gas space 62 and a second end which is connected in fluid flow communication with an off gas treatment member (e.g. a destructor) when carafe 14 is placed on base 12 and apparatus 10 is actuated to treat water in carafe 14.

Referring to FIG. 3, carafe 14 is provided with a support rod 64 having an arm 66. Arm 66 has an upper end 68 positioned in head gas space 62 when apparatus 10 is operational. Support rod 64 and arm 66 are hollow so as to define a passage 70 extending from head gas space 62 through bottom 26 of carafe 14. Support rod 64 is provided with an end portion 72 which is connectable in air flow communication with off gas conduit 74. Off gas conduit 74 is in air flow communication with off gas treatment member 76. Off gas treatment member 76 may optionally be positioned in one of the housings 18. Off gas treatment member 76 may be a destructor for catalytically converting the ozone to a benign gas. Alternately, it may be an off gas sensor, eg. so as to monitor the concentration of ozone in the off gas and provide feed back to the system so as to control the batch cycle. Alternately, a destructor and a sensor may be provided downstream of off gas conduit 74.

Preferably, upper end 68 is positioned above water inlet ports 32 so that, when the unit is filled, water will not enter into passage 70. It will also be appreciated that by placing upper end 68 to one side of carafe 14 (e.g. spaced from water inlet ports 32) that water will tend not to enter passage 70 as carafe 14 is filled. It will also be appreciated that upper end 68 may be configured so as to inhibit the entry of water regardless of the position of upper end 68 with respect to water inlet ports 32. Upper end 68 should be far enough above the water line so that the increase in water volume when air is bubbled through it does not cause water to drain into passage 70. As upper end 68 is positioned and/or configured so as not to allow water to enter passage 70 there through, end portion 72 need not include a valve member to seal passage 70. Accordingly, as shown in FIG. 5, end portion 72 may be opened when carafe 14 is removed from base 12.

Figure 4:
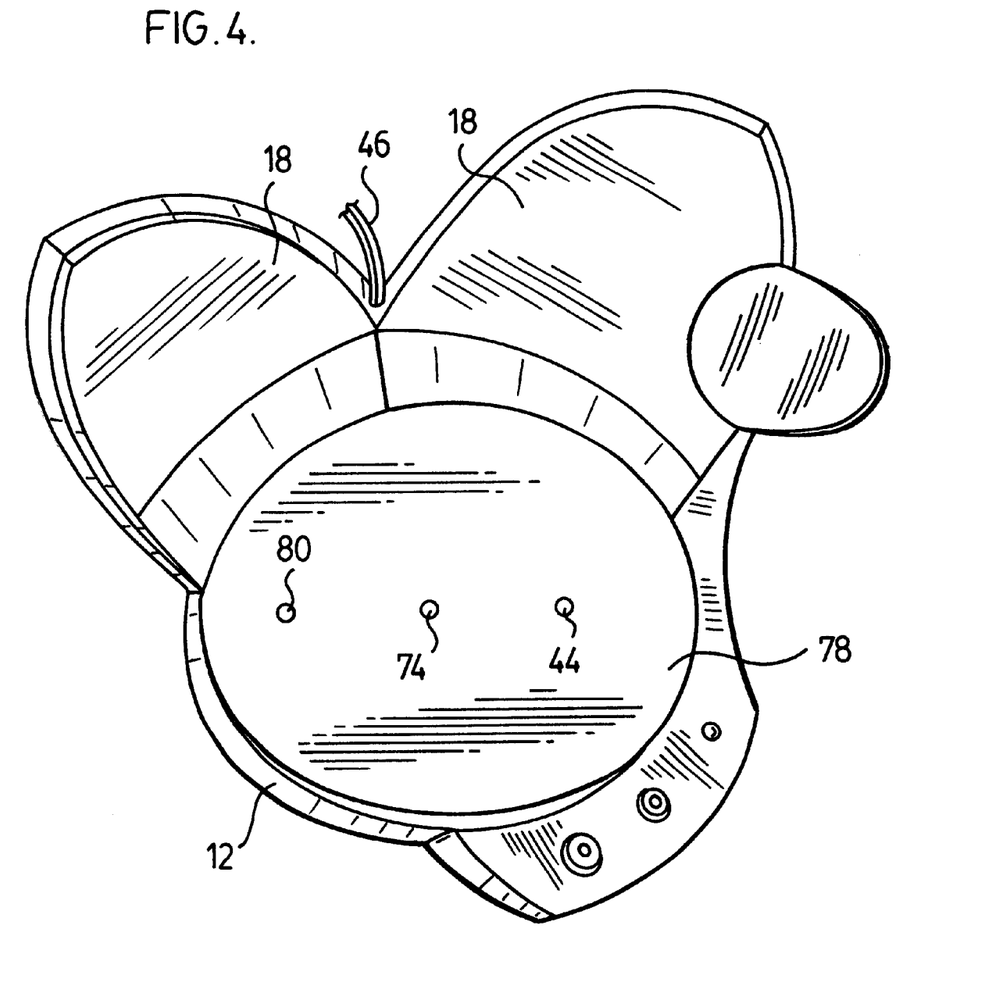
FIG. 4 is a top plan view of the apparatus shown in FIG. 4 with the treatment carafe removed therefrom; and, FIG. 5 is a cross-section along the line 3—3 of FIG. 2 of the treatment carafe when removed from the base portion of the apparatus.

Referring to FIG. 4, base 12 is shown having a generally horizontal upper surface 78. Upper surface 78 is configured so as to allow bottom 26 to be seated thereon. The seating of bottom 26 on upper surface 78 is shown in detail in FIG. 3. As shown in FIG. 4, three openings are provided in upper surface 78. The first is the upper end of supply conduit 44 which is engaged with supply port 40 when carafe 14 is placed on base 12. The second is the top of water outlet conduit 80 which receives treated water when valve 50 is opened. The third is the upper end of off gas conduit 74. End portion 72 engages the upper end of off gas conduit 74 when carafe 14 is placed on base 12.

Accordingly, it will be understood that one advantage of the instant invention is that head gas space 62 is automatically in communication with off gas conduit 74 by placing carafe 14 on base 12. The user need not make any connections between the carafe and an off gas treatment conduit. Accordingly, ozone will not be accidentally released during the operation of the unit if the consumer forgets to make a connection. Further, if an off gas sensor is used to control the duration of the treatment cycle, all of the off gas will be available for passage through a sensor via conduit 74.

In accordance with another embodiment of this invention, sealing member 82 is provided for closing water inlet ports. Sealing member 82 is movable between a first position in which water inlet 32 is sealed (see FIG. 3) and a second position in which the water inlet ports 32 are open (see FIG. 5). Referring to FIG. 3, when carafe 14 is placed on base 12 and is ready for a treatment cycle to begin, sealing member 82 is in the closed position. In this position, engagement surface 84 of sealing member 82 contacts engagement surface 86 of carafe 14 thereby creating a seal between water inlet 32 and the interior of carafe 14. As shown in FIG. 5, when carafe 14 is removed from the unit and is ready to be filled, sealing member 82 is displaced from engagement surface 86 thereby allowing water to enter through water inlet 32 into carafe 14.

A linkage, which is connected to sealing member 82, is provided for moving sealing member 82 between the second and first positions in response to the placement of carafe 14 on base 12. Thus, when carafe 14 is placed on base 12, carafe 14 is automatically sealed and ready for the commencement of a treatment cycle. In a preferred embodiment, sealing member 82 is provided at the upper end of support rod 64 which acts as the linkage or driving member. The engagement of end portion 72 into the upper end of off gas conduit 74 drives sealing member 82 (which may be a resilient member which is resistant to ozone) into engagement with engagement surface 86. Thus, end portion 72 comprises an actuating means drivingly connected to sealing member 82 and operably responsive to placement of carafe 14 on base 12. It will be appreciated that other means may be provided for moving the sealing means. For example, handle 28 may have a trigger to open sealing member 82 when the user picks up carafe 14. Thus the user may automatically open water inlet 32 when they pick up the carafe and seal water inlet 32 when they release handle 28.

In the preferred embodiment shown in FIGS. 3 and 5, support rod 64 (with end portion 72) operates both as the actuating means as well as the gas conduit means for connecting head gas space 62 with off gas conduit 74. It will be appreciated that different apparatus may be included in carafe 14 for performing each of these different functions. It will further be appreciated that only one of these two apparatus (i.e. one of the actuating means and the gas conduit means) may be provided in a carafe 14.

In order to prevent water from leaking from carafe 14 into off gas conduit 74, a sealing member may be provided. The sealing member may comprise a water tight bushing provided in bottom 26 surrounding end portion 72. Alternately, as shown in FIGS. 3 and 5, a diaphragm 88 may be provided. Diaphragm 88 is a deformable member (preferably a resilient member) which may be made from any ozone resistant material. The upper portion of diaphragm 88 has an opening defining an upper perimeter 90 which surrounds the upper end of end portion 72 and forms a water tight seal therewith. The lower portion of diaphragm 88 is provided with a lower perimeter 92 which is connected to the interior of bottom 26 so as to form a water tight seal with bottom 26. As support rod 64 moves downwardly to the open position (see FIG. 5) and then back upwardly to the sealed position (see FIG. 3) diaphragm 88 flexes downwardly and upwardly to maintain a water tight seal.

Support rod 64 may be designed so as to automatically move to the open position as shown in FIG. 5 due the force of gravity when carafe 14 is removed from base 12. Alternately, a biasing member (e.g. a spring or other resiliently deformable member) may be provided to bias support rod 64 to the open position. The biasing member may be provided so as to interact with any portion of support rod 64 (either upper end 96 or end portion 72). For example, a spring 98 may be provided around support arm 100 and upper end 96. Spring 98 exerts a downward pressure on support rod 64 at all times. Accordingly, when carafe 14 is removed from base 12, spring 98 will cause support rod 64 to move to the downward position. The weight of carafe 14 is sufficient, particularly when filled with water, to cause support rod 64 to move upwardly thereby compressing spring 98. Alternately, it will be appreciated that diaphragm 88 may be configured to bias support rod 64 to the open position.

It will be appreciated by those skilled in the art that various additions and modifications may be made to the instant invention and all of these are within scope of the following claims.

I claim:

1. A water treatment apparatus comprising:
 (a) a base;
 (b) a water treatment reservoir removable from the base, the reservoir having a water inlet and an upper surface;
 (c) a sealing member movably mounted between a first position in which the water inlet is sealed and a second position in which the water inlet is open; and,
 (d) a linkage connected to the sealing member for moving the sealing member between the second and first positions in response to the placement of the reservoir on the base.

2. The apparatus as claimed in claim 1 wherein the linkage has an end portion which contacts the base when the reservoir is placed on the base whereby the contact between the end portion and the base moves the sealing member from the second position to the first position.

3. The apparatus as claimed in claim 2 wherein the linkage comprises a support rod extending upwardly from the end portion to the sealing member.

4. The apparatus as claimed in claim 3 wherein the reservoir has an inner surface and an opening, the end portion extending through the opening, and the apparatus further comprises a resilient member having an opening in sealing engagement with the support rod and a lower perimeter in sealing engagement with the interior surface of the reservoir surrounding the opening.

5. The apparatus as claimed in claim 3 wherein the water is treated with an oxidizing gas and the reservoir has a head gas space in which off gas may accumulate after passing through water in the reservoir and the support rod comprises a conduit in communication with the head gas space whereby off gas may be conveyed from the head gas space during the treatment of water in the reservoir.

6. The apparatus as claimed in claim 1 further comprising a biasing member to bias the sealing member to the second position.

7. The apparatus as claimed in claim 1 wherein the reservoir has a recess provided in the upper surface and the water inlet is provided in the recess.

8. The apparatus as claimed in claim 7 wherein the water is treated with an oxidizing gas and the recess is configured to define a head gas space in the reservoir in which off gas may accumulate after passing through water in the reservoir.

9. The apparatus as claimed in claim 8 further comprising a conduit in communication with the head gas space whereby off gas may be conveyed from the head gas space during the treatment of water in the reservoir.

10. The apparatus as claimed in claim 8 further comprising a destructor for converting the off gas to a gas comprising oxygen.

11. The apparatus as claimed in claim 8 further comprising a sensor and the conduit is in fluid flow communication with the sensor when the reservoir is placed on the base.

12. An apparatus for treating water with a gas, the apparatus comprising:
 (a) a base;
 (b) a water treatment reservoir having a water inlet, an upper surface and a head gas space for receiving off gas;
 (c) a sealing member movably mounted between a first position in which the water inlet is sealed and a second position in which the water inlet is open; and,
 (d) a gas conduit having a first end in fluid flow communication with the head gas space and a second end which is connected in fluid flow communication with an off gas treatment member provided in the base when the reservoir is placed on the base whereby the off gas may be conveyed from the head gas space to the off gas treatment member during the treatment of water in the reservoir.

13. The apparatus as claimed in claim 12 further comprising a driving member for moving the sealing member between the first and second positions.

14. The apparatus as claimed in claim 13 wherein the driving member has an end portion which contacts the base when the reservoir is placed on the base whereby the contact between the end portion and the base moves the sealing member from the second position to the first position.

15. The apparatus as claimed in claim 14 further comprising a biasing member to bias the sealing member to the second position.

16. The apparatus as claimed in claim 14 wherein the conduit comprises part of the driving member.

17. The apparatus as claimed in claim 13 wherein the driving member has a hollow interior which comprises the conduit.

18. The apparatus as claimed in claim 12 wherein the reservoir has a recess provided in the upper surface and the head gas space and the water inlet are provided in the recess.

19. The apparatus as claimed in claim 12 wherein the off gas treatment member comprises a sensor.

20. The apparatus as claimed in claim 12 wherein off gas treatment member comprises a destructor.

21. An apparatus for treating water with an oxidizing gas in a water treatment reservoir comprising:

(a) a base;

(b) a water treatment reservoir removable from the base, the reservoir having water inlet means and an upper surface;

(c) movably mounted sealing means for sealing the water inlet means when the sealing member is in a closed position; and, (d) actuating means drivingly connected to the sealing means and having a portion provided on the exterior of the reservoir to move the sealing means to the closed position.

22. The apparatus as claimed in claim 21 wherein the actuating means is operably responsive to placement of the reservoir on the base whereby the sealing means moves to the closed position in response to the placement of the reservoir on the base.

23. The apparatus as claimed in claim 21 further comprising biasing means to bias the sealing means to the second position.

24. The apparatus as claimed in claim 21 wherein the reservoir has a recess provided in the upper surface which defines a chamber in the reservoir in which off gas may accumulate after passing through water in the reservoir.

25. The apparatus as claimed in claim 24 further comprising conduit means in communication with the chamber whereby off gas may be conveyed from the chamber during the treatment of water in the reservoir.

26. The apparatus as claimed in claim 25 further comprising sensing means and the conduit means is in fluid flow communication with the sensing means during treatment of water in the reservoir.

27. An apparatus for treating water with a gas, the apparatus comprising:

(a) a base;

(b) a water treatment reservoir having water inlet means, an upper surface and off gas receiving means associated with the reservoir;

(c) movably mounted sealing means for sealing the water inlet means when the sealing means is in a closed position; and, (d) gas conduit means in fluid flow communication with the off gas receiving means and automatically connectable in fluid flow communication with off gas treatment means provided in the base when the reservoir is placed on the base and the apparatus is operated to treat water in the reservoir.

28. The apparatus as claimed in claim 27 further comprising actuating means drivingly connected to the sealing means and having a portion provided on the exterior of the carafe to move the sealing means to the closed position.

29. The apparatus as claimed in claim 28 wherein the actuating means is operably responsive to placement of the reservoir on the base whereby the sealing means moves to the closed position in response to the placement of the reservoir on the base.

30. The apparatus as claimed in claim 28 further comprising a biasing member to bias the sealing means to the closed position.

31. The apparatus as claimed in claim 28 wherein the conduit means comprises part of the actuating means.

32. The apparatus as claimed in claim 27 wherein the off gas treatment means comprises a destructor.

33. The apparatus as claimed in claim 27 wherein the off gas treatment means comprises off gas sensing means.

34. An apparatus for treating water with a gas, the apparatus comprising:

(a) a base;

(b) a water treatment reservoir removable from the base, the reservoir having a water inlet and an upper surface; and, (c) a sealing member movably mounted automatically in response to the placement of the reservoir on the base between a first position in which the water inlet is sealed and a second position in which the water inlet is open.

35. The apparatus as claimed in claim 34 wherein the water inlet is provided in the upper surface of the water treatment reservoir.

* * * * *